US006198979B1

(12) United States Patent
Konno

(10) Patent No.: US 6,198,979 B1
(45) Date of Patent: Mar. 6, 2001

(54) METHOD AND SYSTEM FOR GENERATING FREE-FORM SURFACES WITH NON UNIFORM RATIONAL B-SPLINE (NURBS) BOUNDARY GREGORY PATCHES

(75) Inventor: Kouichi Konno, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/058,032

(22) Filed: Apr. 10, 1998

(30) Foreign Application Priority Data

Apr. 10, 1997 (JP) .................................................. 9-092538

(51) Int. Cl.[7] .................................................. G06T 15/00
(52) U.S. Cl. .............................. 700/98; 700/187; 345/419
(58) Field of Search .............................. 700/98, 182, 187, 700/189; 345/419, 425, 428, 429, 435, 442

(56) References Cited

U.S. PATENT DOCUMENTS

| 5,119,309 | * | 6/1992 | Cavendish et al. .................. 700/182 |
| 5,459,821 | * | 10/1995 | Kuriyama et al. .................... 345/420 |
| 5,481,659 | * | 1/1996 | Nosaka et al. ........................ 345/423 |
| 5,619,625 | * | 4/1997 | Konno et al. ......................... 345/419 |
| 5,883,631 | * | 3/1999 | Konno et al. ......................... 345/423 |

FOREIGN PATENT DOCUMENTS

| 3-80373 | 4/1991 | (JP) . |
| 7-282117 | 10/1995 | (JP) . |

OTHER PUBLICATIONS

Kouichi Konno and Hiroaki Chiyokura, An Approach of Designing Free–Form Surfaces by Using Nurbs Boundary Gregory Patches, Oct. 1994, Computer Aided Geometric Design, vol. 35, No. 10, pp. 2203–2213.*

Chiyokura and Kimura, "Design of Solids with Free–Form Surfaces, Computer Graphics", Proc. SIGGRAPH 83, vol. 17, No. 3, pp. 289–298, 1983.

Chiyokura et al., "G1 Surface Interpolation Over Irregular Meshes with Rational Curves, Nurbs for Curve and Surface Design", Farin, G. Ed., pp. 15–34, SIAM, Philadelphia, 1991.

Liu and Sun, "G1 Interpolation of Mesh Curves, Computer Aided Design", vol. 26, No. 4, pp. 259–267, 1994.

\* cited by examiner

*Primary Examiner*—William Grant
*Assistant Examiner*—Paul Rodriguez
(74) *Attorney, Agent, or Firm*—Knoble & Yoshida, LLC

(57) ABSTRACT

A method of and a system for generating free-form surfaces with NURBS boundary Gregory patches and the formed surface is $G^1$ continuous with adjacent surfaces while the inner areas of the formed surface are $C^1$ continuous.

6 Claims, 10 Drawing Sheets

NURBS BOUNDARY GREGORY PATCH

NURBS BOUNDARY GREGORY PATCH

INTERPOLATING NRBS BOUNDARY GERGORY PATCH

NURBS BOUNDARY GREGORY PATCH

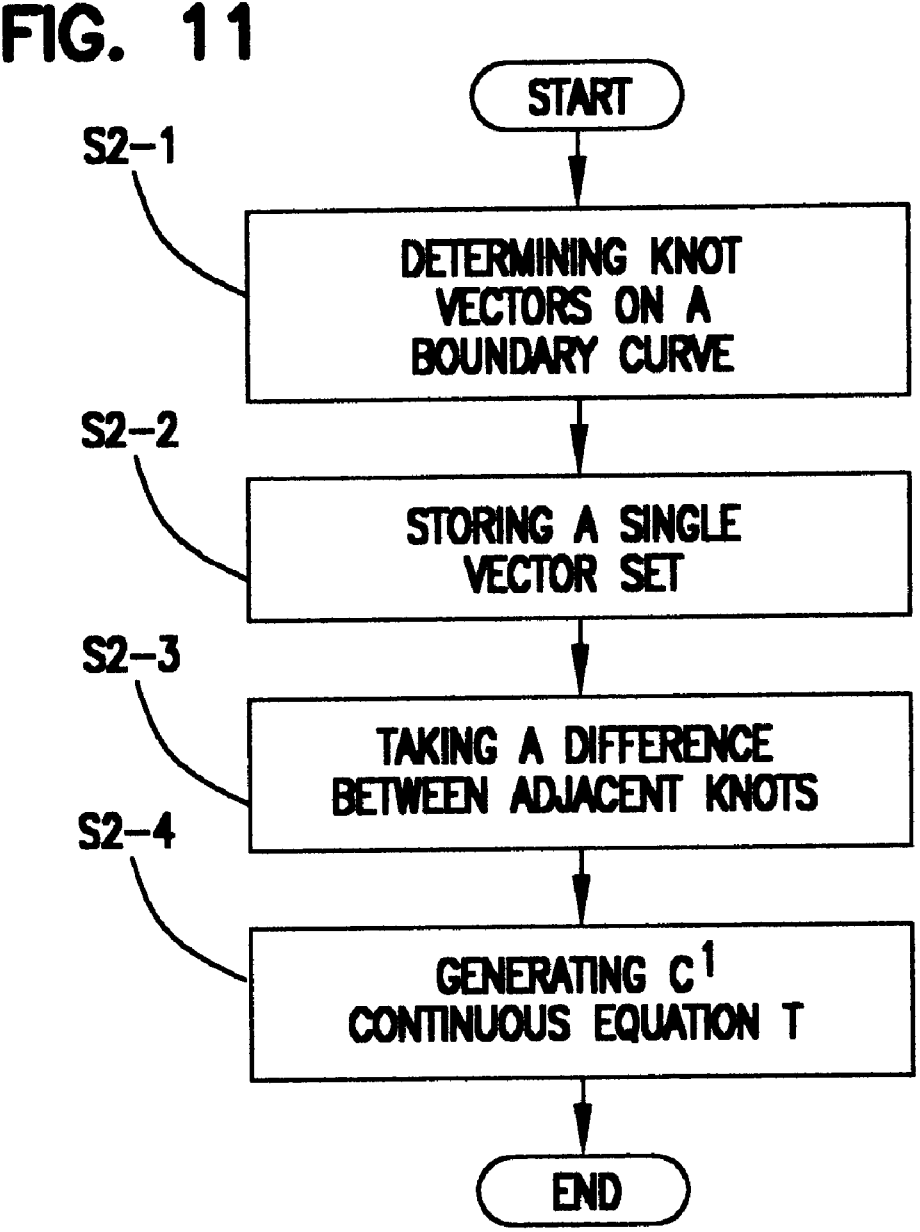

METHOD AND SYSTEM FOR GENERATING FREE-FORM SURFACES WITH NON UNIFORM RATIONAL B-SPLINE (NURBS) BOUNDARY GREGORY PATCHES

FIELD OF THE INVENTION

The current invention is generally related to a method of and a system for generating free-form surfaces, and more particularly related to a method of and a system for generating free-form surfaces with NURBS boundary Gregory patches.

BACKGROUND OF THE INVENTION

To design complex free-form surfaces using a computer aided design (CAD) system, designers generally define a curve mesh that consists of characteristic lines such as boundary curves and cross sections from which the mesh is interpolated. One of commonly used curves is Bezier curves each of which is defined by a predetermined number of points in space. For example, four points including two control points define a cubic Bezier curve in three dimensional space. A plurality of curves may be joined to form a more complex curve. To facilitate the definition of a complex curve, the Non Uniform Rational B-spline (NURBS) curve is a powerful tool since a NURBS curve can represent multiple composite curves including complicated Bezier curves.

To take advantage of a NURB curve, Japanese Patent Publication Hei 7-282117 discloses a method of joining curve meshes including NURBS curves in a first order geometric ($G^1$)continuous manner. Roughly speaking, $G^1$ continuity means that the directions (but not necessarily the magnitudes) of the two tangent vectors are equal at a joint of the adjacent surfaces. Prior attempts have been also made to use a NURB curve as a common boundary between free-form surfaces. An irregular curve mesh bounded by NURBS curves can be smoothly interpolated by using a general boundary Gregory patch which has been disclosed in U.S. Pat. No. 5,619,625. However, the general boundary Gregory patch cannot join adjacent NURBS surfaces with $G^1$ continuity. Chiyokura et al. proposed a Gregory patch (Chiyokura and Kimura, Design of Solids with Free-form Surfaces, Computer Graphics, Proc.SIGGRAPH 83, Vol. 17, No. 3, pp289–298, 1983) and a rational boundary Gregory patch (Chiyokura et al. $G^1$ Surface Interpolation over Irregular Meshes with Rational Curves, NURBS for Curve and Surface Design, Farin, G. Ed., pp. 15–34, SIAM, Philadelphia, 1991) as a curve surface to be joined in a $G^1$ continuous manner. Both the Gregory patch and the rational boundary Gregory patch have a cross boundary derivative which has independent parameters u, v for each direction, and this characteristics enables the insertion of an irregular curve mesh in a $G^1$ continuous manner. Furthermore, Liu et al. proposed a method of using a high degree Bezier curve to smoothly insert a curve mesh (Liu and Sun, $G^1$ Interpolation of mesh curves, Computer Aided Design, Vol. 26, No. 4, pp. 259–267, 1994).

The above described methods enable smooth connections after the curve mesh is modified but require that the curve in the curve mesh is rational Bezier curve. However, when filet offsetting or boolean operations are performed, it is difficult to express certain mesh curves by rational Bezier curves. A NURBS curve can express those mesh lines, and a curve mesh contains the NURBS curve. Since it is impossible to use a NURBS curve as a boundary for a Gregory patch and a Bezier curve surface, it is practically impossible to interpolate an irregular curve mesh containing NURBS curves.

Konno et al. have proposed the use of a NURBS boundary Gregory patch for inserting an irregular curve mesh containing NURBS curves (Konno and Chiyokura, Interpolation Method of Free Surface Using NURBS boundary Gregory Patch, Proceeding of Information Processing Academy, Vol. 35, No. 10, pp.2203–2213, 1994), (Konno and Chiyokura, An Approach of Designing and Controlling Free-Form Surfaces by Using NURBS Boundary Gregory Patches, Computer Aided Geometri Design, Vol. 13, No. 9, pp. 825–849, 1996). Although the NURBS boundary Gregory patch enables a free-surface to have $G^1$ continuity with an adjacent surface regardless of the limitations of a curve mesh, since the above described method divides the NURBS curves into rational Bezier curves, these separate curves in the formed surface generally have Co continuity. In other words, the formed free-surface has mathematically broken areas and remains to be improved to have $C^1$ continuity.

SUMMARY OF THE INVENTION

In order to solve the above and other problems, according to a first aspect of the current invention, a method of generating free-form surfaces with NURBS boundary Gregory patches, includes the steps of: a) selecting a common NURBS boundary curve between two free-form surfaces; b) joining the two free-form surfaces in $G^1$ continuity; and c) maintaining $C^1$ continuity in each of the joined free-form surfaces.

According to a second aspect of the current invention, a method of generating free-form surfaces with NURBS boundary Gregory patches, includes the steps of: a) storing information on control points and corresponding weights for a common NURBS boundary curve; b) storing information on control points and corresponding weights of a curve connected to a terminal of the common NURBS boundary curve; c) determining conditions for a $G^1$ continuity at the terminal based upon the information stored in said steps a) and b); d) forming along the common NURBS boundary free-form surfaces that are $G^1$ continuous with each other; and e)making each of the surfaces formed in said step d) $C^1$ continuous based upon information stored in said steps a) and b) as well as the conditions determined in said step c).

According to a third aspect of the current invention, a recording medium containing a computer program for generating free-form surfaces with NURBS boundary Gregory patches, the computer program, includes the steps of: a) selecting a common NURBS boundary curve between two free-form surfaces; b) joining the two free-form surfaces in $G^1$ continuity; and c) maintaining $C^1$ continuity in each of the joined free-form surfaces.

According to a fourth aspect of the current invention, A recording medium containing a computer program for generating free-form surfaces with NURBS boundary Gregory patches, includes the steps of: a) storing information on control points and corresponding weights for a common NURBS boundary curve; b) storing information on control points and corresponding weights of a curve connected to a terminal of the common NURBS boundary curve; c) determining conditions for a $G^1$ continuity at the terminal based upon the information stored in said steps a) and b); d) forming along the common NURBS boundary free-form surfaces that are $G^1$ continuous with each other; and e) making each of the surfaces formed in said step d) $C^1$ continuous based upon information stored in said steps a) and b) as well as the conditions determined in said step c).

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 11 is a flow chart illustrating steps involved in the $G^1$ as well $C^1$ continuous interpolation process according to the current invention.

DETAILED DESCRIPTION OF THE PREFERRED EMBODIMENT(S)

Figure 1A:
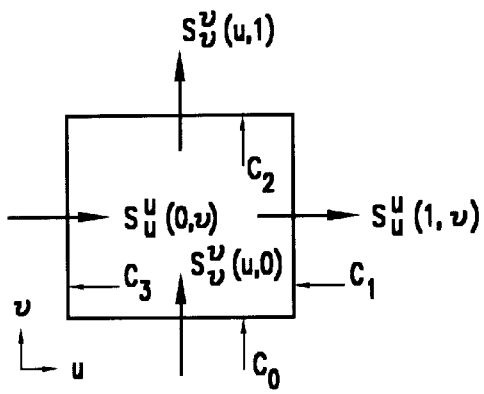
FIGS. 1A–1D illustrate a non-uniform rational b-spline (NURBS) boundary Gregory patch which uses NURBS curves as boundary lines.

Referring now to the drawings, wherein like reference numerals designate corresponding structure throughout the views, and referring in particular to FIG. 1A–1D, a NURBS boundary Gregory patch $S(u, v)$ is diagrammatically illustrated as a sum of patches. In general, a NURBS boundary Gregory (NGB) patch is an extension of a general Gregory patch allowing NURBS representation as boundary curves and cross boundary derivatives (CBDs). A NGB patch $S(u, v)$ is expressed in the following Equation (1).

$$S(u, v) = S^u(u, v) + S^v(u, v) - S^c(u, v) \quad (1)$$

Figure 1C:
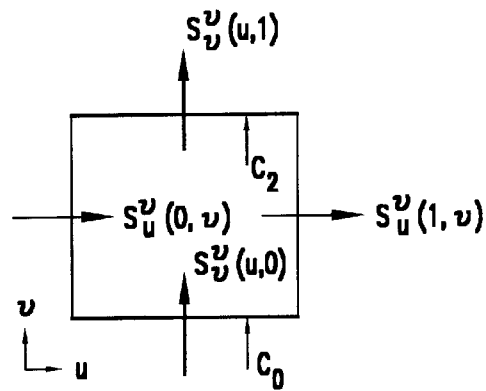
Figure 1B:
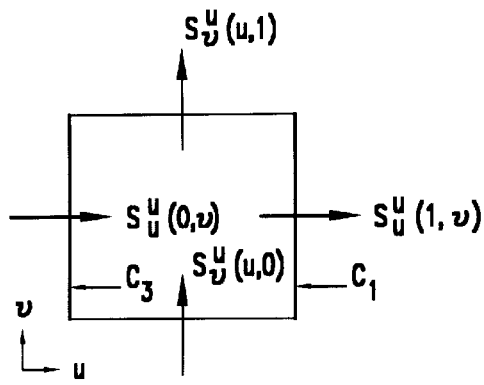
Figure 1D:
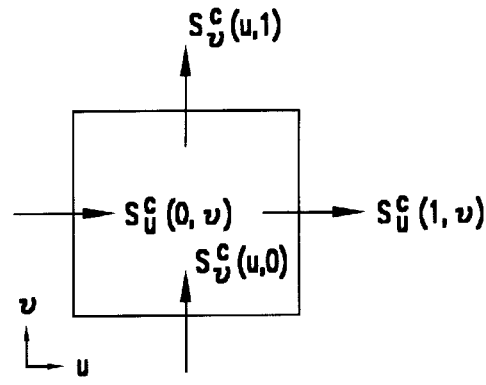

A surface $S^u(u, v)$ or u surface has two NURBS curves $C_3$ and $C^1$ as well as CBDs $S_u''(0, v)$ and $S_u''(1, v)$ as shown in FIG. 1B. Similarly, a surface $S^v(u, v)$ or v surface has two NURBS curves $C_0$ and $C_2$ as well as CBDs $S_v^v(u, 0)$ and $S_v^v(u, 1)$ as shown in FIG. 1C. A surface $S^c(u, v)$ or C surface is a result of addition of the two surfaces u and v and is expressed based upon the patches $S''(u, 0)$, $S''(u, 1)$, $S^v(0, v)$, $S^v(1, v)$ as well as the CBDs $S_v''(u, 0)$, $S_v''(u, 1)$, $S_u^v(0, v)$ and $S_u^v(1, v)$. The curve surfaces with subscrits $S_u$ and $S_v$ respectively indicate $\delta S/\delta u$ and $\delta S/\delta v$.

The NURBS curves $C_3$ and $C^1$ are k-th degree NURBS curves and each has n+1 control points $P_{0,j}^u$ and $P_{3,j}^u$ and corresponding weights $w_{0,j}^u$ and $w_{3,j}^u$. The NURBS curves $C_3$ and $C^1$ are respectively expressed in the following equation (2).

$$C_3(v) = \frac{\sum_{j=0}^{n} N_{j,k}(v) w_{o,j}^u P_{o,j}^u}{\sum_{i=0}^{3} N_{j,k}(v) w_{o,j}^u}, \quad C_1(v) = \frac{\sum_{j=0}^{n} N_{j,k}(v) w_{3,j}^u P_{3,j}^u}{\sum_{i=0}^{3} N_{j,k}(v) w_{3,j}^u} \quad (2)$$

Where $N_{j,k}(v)$ is expressed in the following B-spline basis function (3).

$$N_{j,0}(v) = \begin{cases} 1 & \text{if } v_j \le v < v_{j+1} \\ 0 & \text{otherwise} \end{cases} \quad (3)$$

$$N_{j,k}(v) = \frac{(v - v_j) N_{j,k-1}(v)}{v_{j+k-1} - v_j} + \frac{(v_{j+k} - v) N_{j+1,k-1}(v)}{v_{j+k} - v_{j+1}}$$

However, $v_j$ is a normalized knot vector and is expressed as in the following equation (4).

$$v \text{ directional vector} = \left[ \underbrace{0, \ldots, 0}_{k+1}, \underbrace{v_0 \ldots, v_0}_{k}, \ldots \underbrace{v_j, \ldots, v_j}_{k}, \ldots \underbrace{1, \ldots, 1}_{k+1} \right]. \quad (4)$$

In order to express CBDs $S_u''(0, v)$, $S_u''(1, v)$ in NURBS, a curve surface v is expressed as a NURBS surface in the following equation (5).

$$S^u(u, v) = \frac{\sum_{i=0}^{3} \sum_{j=0}^{n} M_{i,3}(u) N_{j,k}(v) w_{i,j}^u P_{i,j}^u}{\sum_{i=0}^{3} \sum_{j=0}^{n} M_{i,3}(u) N_{j,k} w_{i,j}^u} \quad (5)$$

Where $M_{i,3}$, $N_{j,k}$ are B-spline basis functions as expressed in the above equation (3). A knot vector in the u direction is [0, 0, 0, 0, 1, 1, 1, 1] while a knot vector in the v direction is the above equation (4). The v surface is similarly expressed by a NURBS curve surface.

Figure 2:
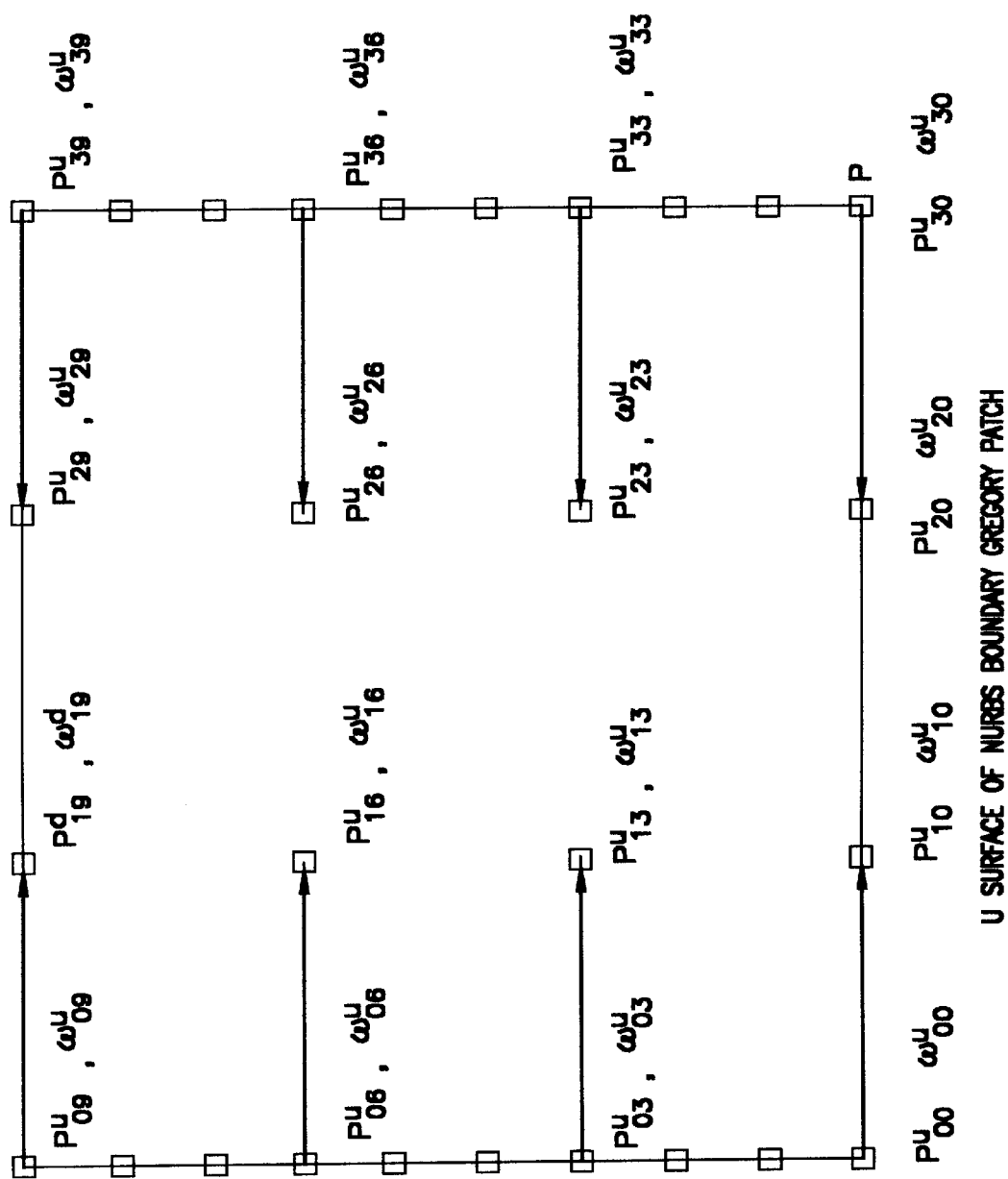
FIG. 2 illustrates a U surface of the NURBS boundary Gregory (NBG) patch.
Figure 3:
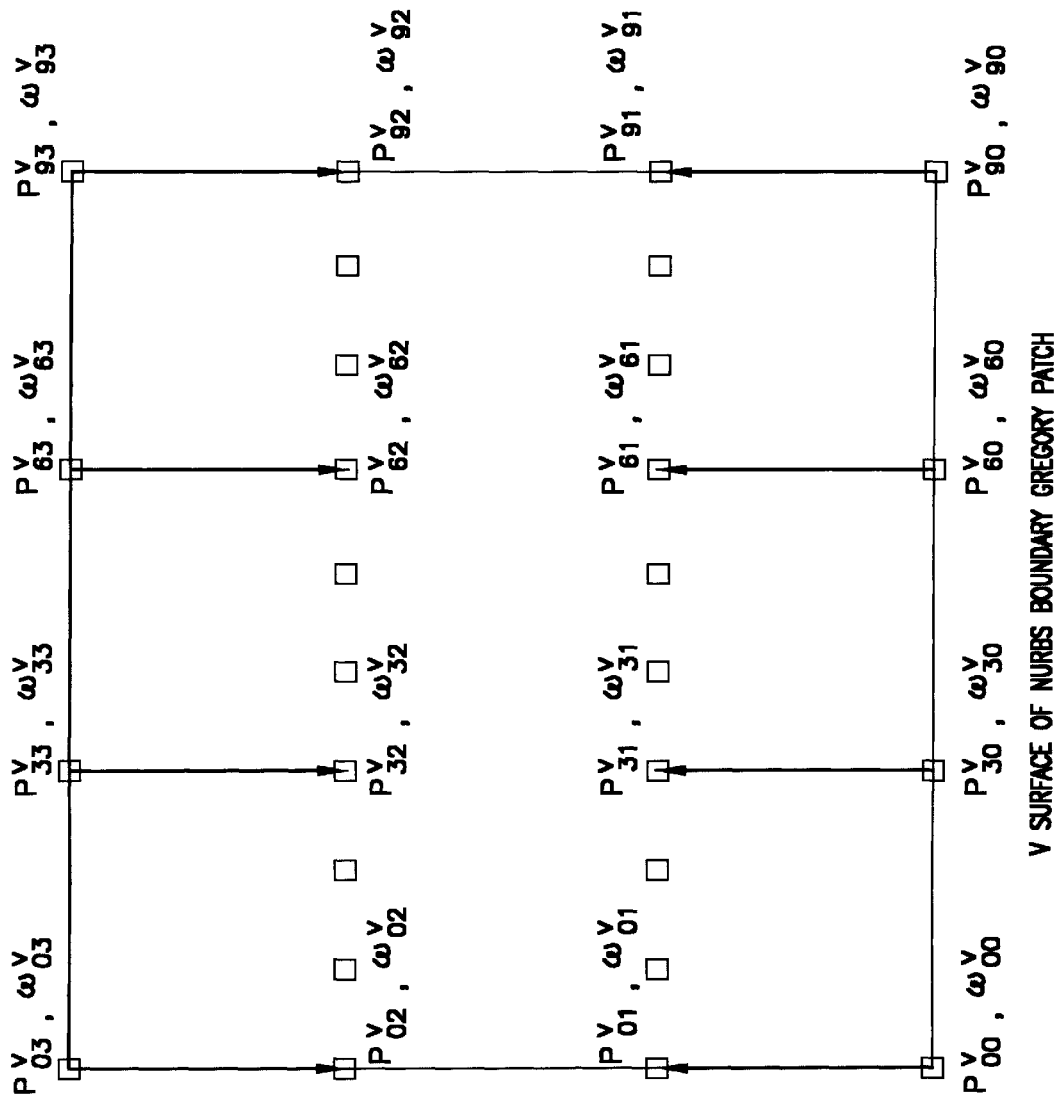
FIG. 3 illustrates a V surface of the NURBS boundary Gregory (NBG) patch.

Referring to FIG. 2, a u curve surface of NBG patch is illustrated with a boundary line having cubic power and ten control points (n=9, k=3). Each control point is represented by a square. The vertical boundary curves include $S''(0, u)$, $S''(1, u)$ and each represent a cubic NURBS curve surface. Each curve is divided into three segments. Each segment is marked by a pair of knot vectors. Similarly, referring to FIG. 3, a v surface of a NBG patch is illustrated with a boundary line having cubic power and ten control points (n=9, k=3). Each control point is represented by a square. The horizontal boundary curves include $S''(u, 1)$, $S''(u, 0)$ and each represent a cubic NURBS surface. Each curve is divided into three segments. Each segment is marked by a pair of knot vectors.

Figure 4:
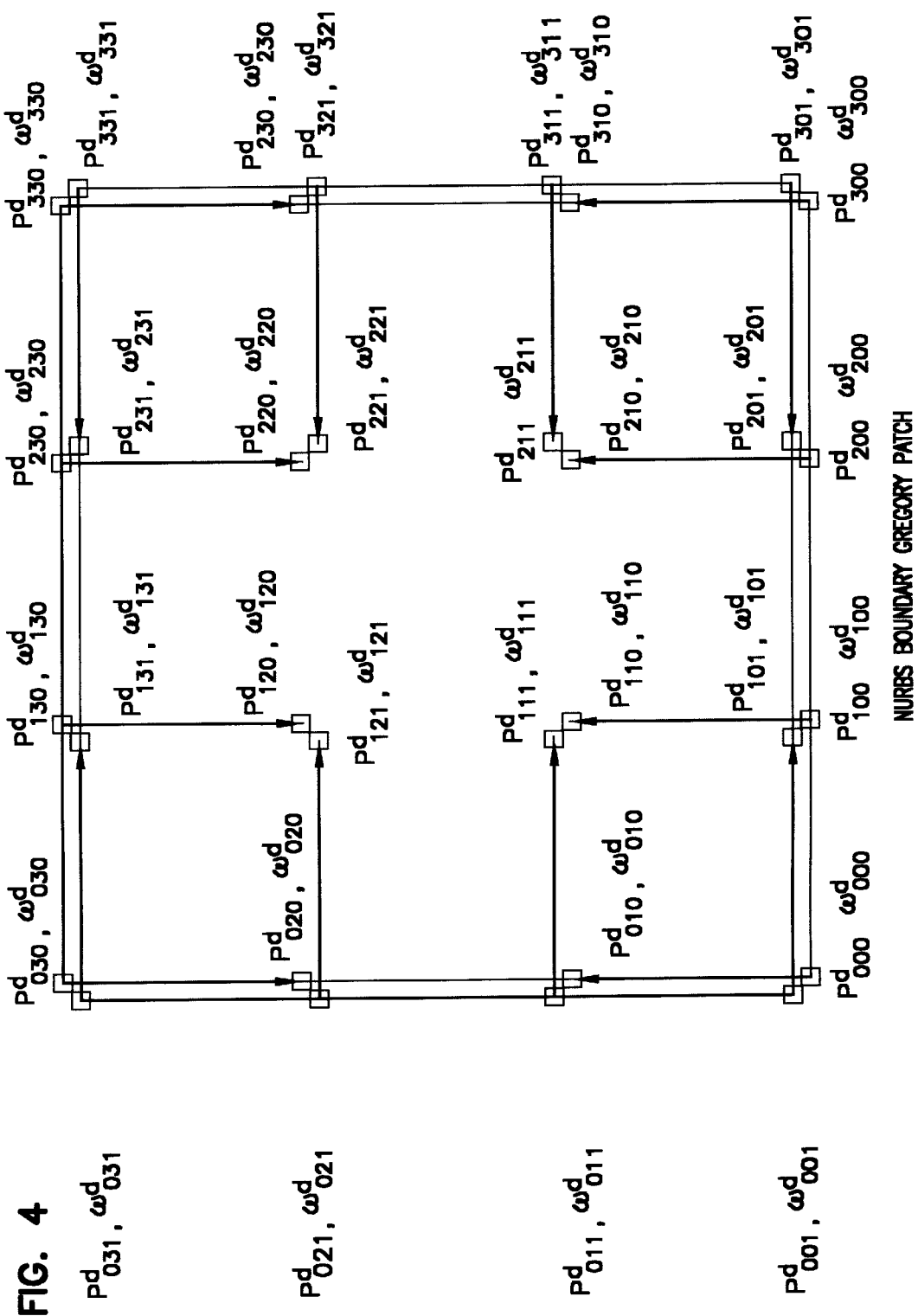
FIG. 4 illustrates the NURBS boundary Gregory (NBG) patch as formed from the U and V surfaces.

Referring to FIG. 4, a C surface of NBG patch is a surplus result of adding the u surface and the v surface. The C surface has thirty two control points P and associated weights w, and each pair of the point and the weight is indicated by a square. The pair is duplicated. When u=0 and u=1, the above equation (1) becomes as follows in the equation (5):

$$S(0, v)=S^u(0, v), S(1, v)=S^u(1, v),$$

$$S_u(0, v)=S_u{}^u(0, v), S_u(1, v)=S_u{}^u(1, v)$$

When v=0 and v=1, the same relationship holds. Based upon the above and the boundary conditions of curve surfaces $S^u$ and $S^v$, the C curve surface $S^c$ must satify the following equation (6):

$$S^u(u, 0)=S^c(u, 0), S^u(u, 1)=S^c(u, 1),$$

$$S^v(0, v)=S^c(0, v), S^v(1, v)=S^c(1, v),$$

$$\delta S^u(u, 0)/\delta v=\delta S^c(u, 0)/\delta v, \delta S^u(u, 1)/\delta v=\delta S^c(u, 1)/\delta v,$$

$$\delta S^v(0, v)/\delta u=\delta S^c(0, v)/\delta u, \delta S^v(1, v)/\delta u=\delta S^c(1, v)/\delta u. \quad (6)$$

A CBD in the C surface is limited by two surfaces u and v, it is necessary to independently control the CBD using separate parameters. The C surface is a cubic rational equation as expressed in the following equations (7) and (8).

$$S^c(u, v) = \frac{\sum_{i=0}^{3} \sum_{j=0}^{3} B_i^3(u) B_j^3(v) Q_{ij}(u, v)}{\sum_{i=0}^{3} \sum_{j=0}^{3} B_i^3(u) B_j^3(v) W_{ij}(u, v)}. \quad (7)$$

$$Q_{ij}(u, v) = \frac{b_{i/2}(u) w_{ij0}^d P_{ij0}^d + b_{j/2}(v) w_{ij1}^d P_{ij1}^d}{b_{i/2}(u) + b_{j/2}(v)}, \quad (8)$$

$$W_{ij}(u, v) = \frac{b_{i/2}(u) w_{ij0}^d + b_{j/2}(v) w_{ij1}^d}{b_{i/2}(u) + b_{j/2}(v)}$$

Where $b_0(t)=t^2$, $b_1(t)=(1-t)^2$.

As described above, each pair of the control point P and the associated weight w is duplicated. Terms containing a control point $P_{ij0}{}^d$ and a weight $w_{ij0}{}^d$ become 0 when parameters u=0 or u=1. Terms containing a control point $P_{ij1}{}^d$ and a weight $w_{ij1}{}^d$ become 0 when parameter v=0 or v=1. Based upon the above relationships, terms $P_{ij0}{}^d$ and $w_{ij0}{}^d$ are determined from the u surface while terms $p_{ij1}{}^d$ and $w_{ij1}{}^d$ are determined from the v surface. By applying the above equations (6) and (7), a control point $P_{ij0}{}^d$ and a weight $w_{ij0}{}^c$ are defined by the following equations (9) and (10).

When $i = 0, \ldots, 3; j = 1$ $$w_{i10}^d P_{i10}^d = w_{i0}^u P_{i0}^u + \frac{1}{v_0}(w_{i1}^u P_{i1}^u - w_{i0}^u P_{i0}^u), \quad (9)$$

$$w_{i0}^d = w_{i0}^u + \frac{1}{v_0}(w_{i1}^u - w_{i0}^u)$$

When $i = 0, \ldots, 3; j = 2$, $$w_{i20}^d P_{i20}^d = w_{i3}^u P_{i3}^u + \frac{1}{1-v_1}(w_{i2}^u P_{i2}^u - w_{i3}^u P_{i3}^u), \quad (10)$$

$$w_{i20}^d = w_{i3}^u + \frac{1}{1-v_1}(w_{i2}^u - w_{i3}^u)$$

Where $v_0$ and $v_1$ are v direction knot vectors at control points $P_{03}{}^u$ and $P_{06}{}^u$ on the u surface.

When ij≠01, 11, 21, 31, 02, 12, 22, 32;

$$P_{ij0}{}^d = P_{ij}{}^u, w_{ij0}{}^d = w_{ij}{}^u \quad (11)$$

The points on the four corners of the C surface respectively coincide as expressed in the following equation (12).

$$P_{000}{}^d = P_{001}{}^d, P_{300}{}^d = P_{301}{}^d, P_{030}{}^d = P_{031}{}^d, P_{330}{}^d = P_{331.}{}^d \quad (12)$$

Similarly, a control point $P_{ij1}{}^d$ and a weight $w_{ij1}{}^d$ are determined from the v curve surface.

The NBG patch has the following features. A CBD is independently defined for each boundary. By satisfying the equation (6) for the C curve surface, an irregular curve mesh can be smoothly inserted. For example, when u=0, $S_u(0, v)=S_u{}^u(0, v)$. Based upon the equation (1), the u and v surfaces are independently specified, and the equation (12) is the only conditions for the u and v parameters on the boundary curve. Thus, the weight at the ends of each boundary is independently controlled. Since the boundary curve is a NURBS curve, an NGB path joins an adjacent Gregory type surface such as a Gregory patch, a rational boundary, and a general boundary Gregory patch with $G^1$ continuity. A CBD of an NBG patch is represented in a NURBS form and includes a rational Bezier formulation. If a boundary curve is a Bezier curve, internal control points are determined using a connection equation for the Gregory patch to establish a smooth connection. If a boundary curve is a rational Bezier curve, CBDs are determined using a connection equation for the rational boundary Gregory patch to establish a smooth connection. Another characteristics is that it is also possible to convert a NBG patch into a NURBS curve surface. The u and v surfaces are expressed by NURBS surfaces. Since the C curve surface has an expression equivalent to a rational boundary Gregory patch, it is possible to convert into a NURBS curve surface. Furthermore, since three NURBS surfaces are represented by a single NURBS, NBG patches are converted into one NURBS surface.

Figure 5:
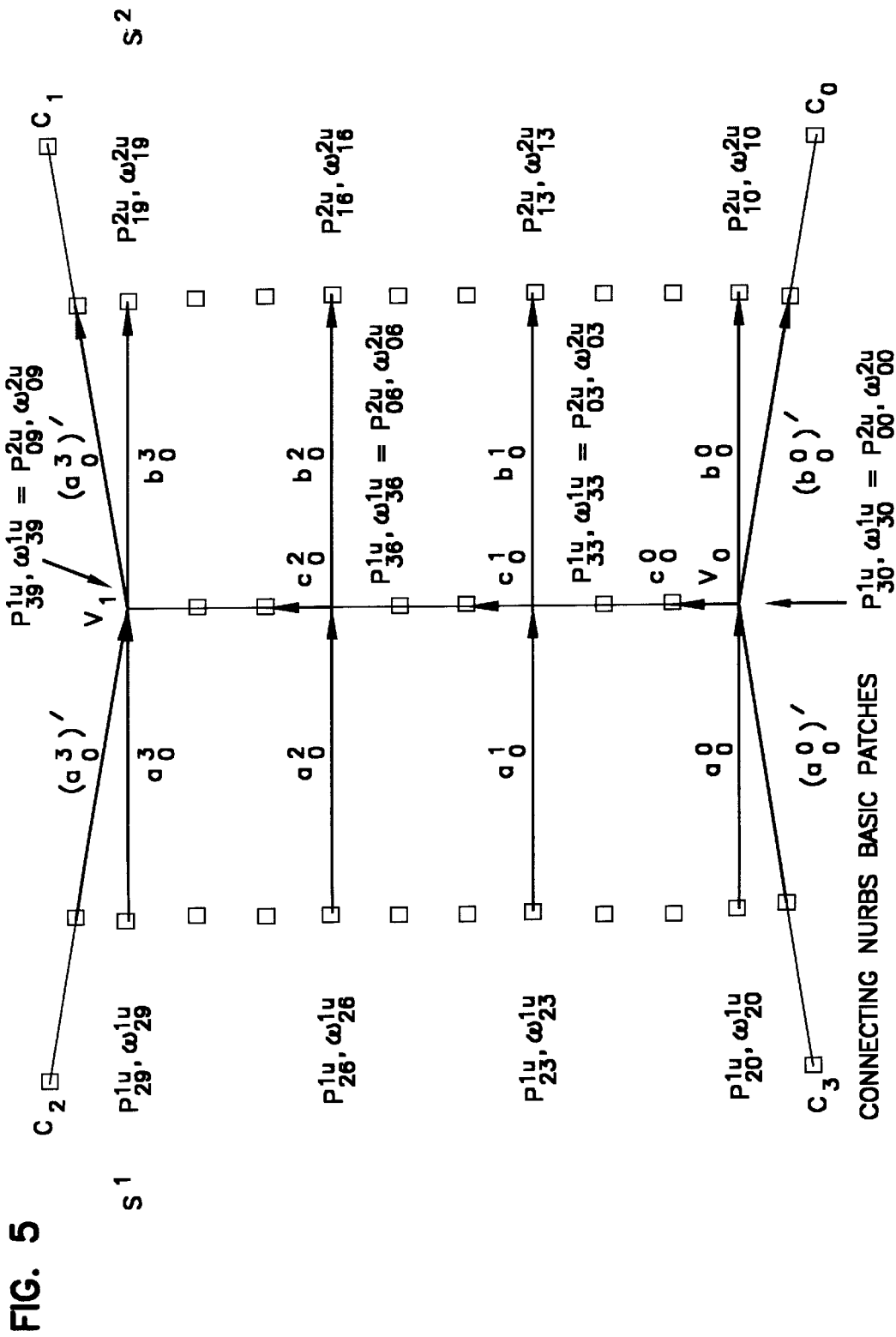
FIG. 5 diagrammatically illustrates the connection of two NBG patches.

Referring to FIG. 5, two surfaces $S^1$ and $S^2$ share a common boundary curve. For the sake of simplicity, the common boundary curve is a cubic NURBS curve which has two knots. The following equation (13) specifies conditions for the two surfaces $S^1$ and $S^2$ to be $G^1$ continuous.

$$\frac{\partial S^2(0, v)}{\partial u} = k(v) \frac{\partial S^1(1, v)}{\partial u} + h(v) \frac{\partial S^1(1, v)}{\partial u} \quad (13)$$

Where k(v) and h(v) are arbitrary scalar functions. Based upon the features of a NBG patch, the above equation (13) is converted into the following equation (14).

$$S_u{}^{2u}(0, v) = k(v) S_u{}^{1u}(1, v) + h(v) S_v{}^{1u}(1, v). \quad (14)$$

Still referring to FIG. 5, let $S^{1u}$ be a u surface of the surface $S^1$ while let $S^{2u}$, be a u surface of the curve surface $S^2$. To have the $G^1$ continuity between the two surfaces, only the u curve surface is considered. Furthermore, let in-between control point vectors be $a_i^j$, $b_i^j$, and $c_i^j$ where i=0, 1 and 2 and j=0, 1 and 2. By using these vectors and weights at the control points, differential vector functions are expressed in the u and v directions. By applying the differential vector functions to the above $G^1$ continuous condition equation (14), the two curve surfaces are smoothly joined. However, since the u and v directional differential equations in the $S^u$ expression (5) become complex and it is difficult to solve the $G^1$ continuous condition equation, the connection equation is derived based upon the assumption that the v directional knot vector on the u curve surface is converted into an expression similar to the equation (4). By solving simultaneous equations for a $G^1$ continuous boundary curve as well as for a $C^1$ continuous CBD, a free-form surface is formed with the $G^1$ continuity with adjacent surfaces and the $C^1$ continuity within the free-form surface.

Figure 6:
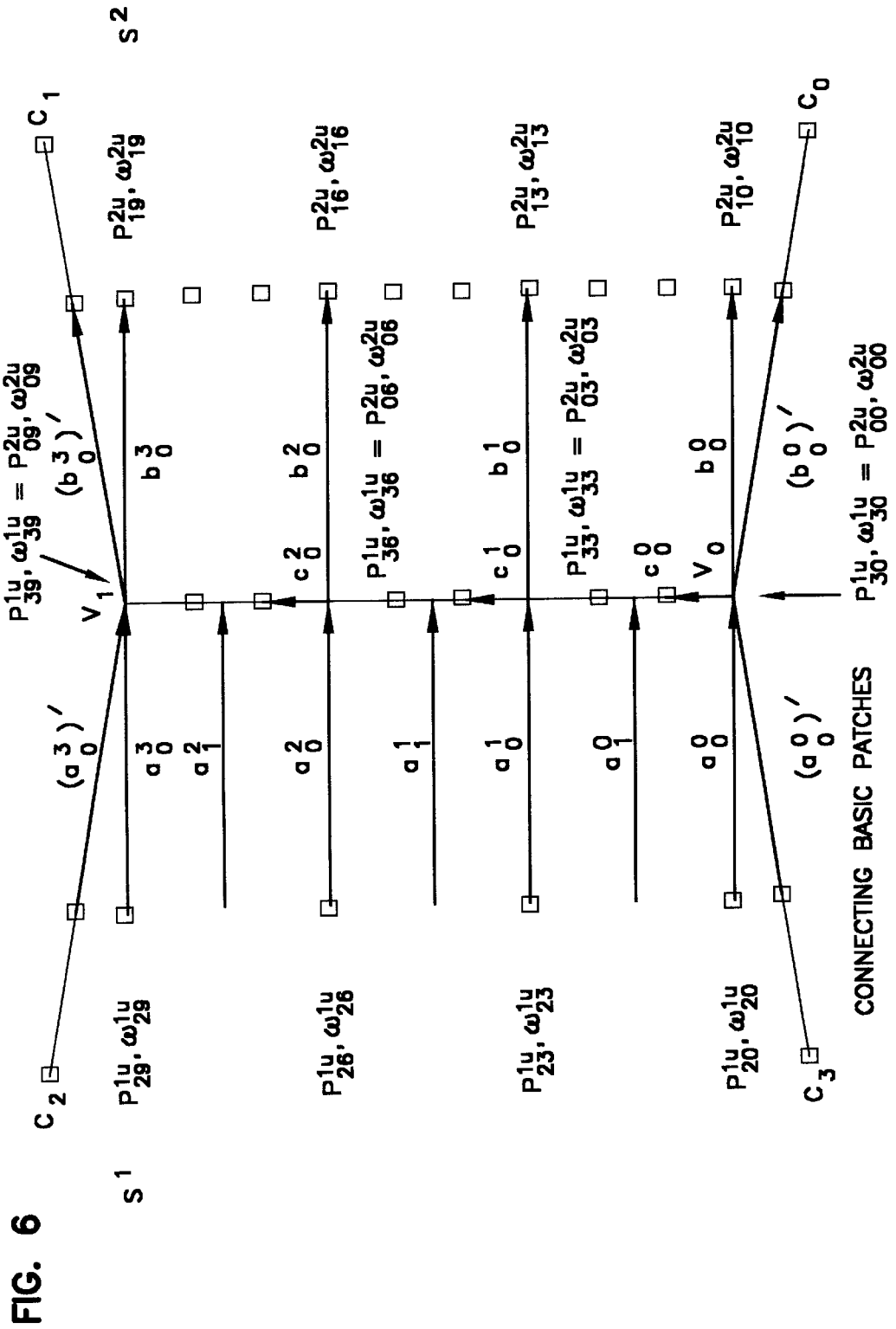
FIG. 6 diagrammatically illustrates the connection to a basis patch.

In order to have the $G^1$ continuity across a common boundary curve, a prior art basis patch method is used to join two curve surfaces $S^{1u}$ and $S^{2u}$. The basis patch method is generally known as an easy method since a common degree is used between the two curve surfaces. According to the basic patch, a differential vector function of an in-between control vector $a_i^j$, is expressed by a differential vector $b_i^j$, which has one less degree. Referring to FIG. 6, a CBD a(v) of a curve surface $S^{1u}$ is expressed by a quadratic equation including control points $a_i^j$, and weights $w_{2k}^{1u}$, $w_{3k}^{1u}$, (k=0, ..., 9). Similarly, a CBD b(v) of a curve surface $S^{2u}$ is expressed by a cubic equation including in-between control points $b_i^j$, and weights $w_{0k}^{2u}$, $w_{1k}^{2u}$ and also defined as $$b(v) = \sum_{l=0}^{m} N_{l,k}(v) b_j^i$$

where $N_{l,k}$ is defined in the equation (3). It is also disclosed in prior art that the $G^1$ continuity is maintained by assuming a scalar function h(v) in the equation (14) to be h(v)=0. Thus, the conditional equation for the $G^1$ continuity is expressed by the following equation (15).

$$b(v)=k(v)a(v) \tag{15}$$

where $k(v)=k_0(1-v)+K_1 v$ and $k_0 \cdot k_1$ is a scalar amount. For the CBD b(v) to be the $C^1$ continuous at knot points $P_{03}^{2u}$ and $P_{06}^{2u}$ on a common boundary, the conditional equation is expressed by the following equation (16).

$$b_0^{i+1}=(1-t_{i+1})b_2^i+t_{i+1}b_1^{i+1} \tag{16}$$

where $t_i$ and $t_{i+1}$ express a distance between the knot points $P_{03}^{2u}$ and $P_{06}^{2u}$, on a boundary curve. In order to simplify the CBD equation, the weights at boundary control points are assumed to be the same as those at inner control points as in the following equation (17).

$$w_{2k}^{1u}=w_{3k}^{1u}=w_{0k}^{2u}=w_{1k}^{2u} \ (k=0,\ldots,9) \tag{17}$$

In order for the above equation (16) to be satisfied, the boundary curve must be $C^1$ continuous. At each end point $V_0$ and $V_1$ of the boundary curve, the conditions for the $G^1$ continuity are expressed by the following equations (18) and (19):

$$b_0^0=k_0^0 a_0^0 \tag{18}$$

$$b_0^3=k_0^3 a_0^3 \tag{19}$$

At each knot point on the boundary curve, the conditions for the $G^1$ continuity are expressed by the following equations (20) and (21):

$$b_0^1=k_0^1 a_0^1 \tag{20}$$

$$b_0^2=k_0^2 a_0^2 \tag{21}$$

At control points, the conditions for the $G^1$ continuity are expressed by the following equations (22) through (27):

$$b_1^0 = \frac{2}{3}k_0^0 a_1^0 + \frac{1}{3}k_0^1 a_0^0 \tag{22}$$

$$b_2^0 = \frac{2}{3}k_0^1 a_1^0 + \frac{1}{3}k_0^0 a_0^1 \tag{23}$$

$$b_1^1 = \frac{2}{3}k_0^1 a_1^1 + \frac{1}{3}k_0^2 a_0^1 \tag{24}$$

$$b_2^1 = \frac{2}{3}k_0^2 a_1^1 + \frac{1}{3}k_0^1 a_0^2 \tag{25}$$

$$b_1^2 = \frac{2}{3}k_0^2 a_1^2 + \frac{1}{3}k_0^3 a_0^2 \tag{26}$$

$$b_2^2 = \frac{2}{3}k_0^3 a_1^2 + \frac{1}{3}k_0^2 a_0^3 \tag{27}$$

In order for the CBD a(v) to be $C^1$ continuous, the conditions are expressed in the following equation (28).

$$a_0^{i+1}=(1-t_{i+1})a_1^j+t_{i+1}a_1^{i+1} \tag{28}$$

In the above equations, unknowns include $k_0^0$, $k_0^1$, $k_0^2$, $k_0^3$, $b_1^0$, $b_2^0$, $b_1^1$, $b_2^1$, $b_1^2$ and $b_2^2$. In order to solve for $k_0^0$ and $k_0^3$, the above equations (18) and (19) are used. Since the CBD b(v) is $C^1$ continuous, from the above equations (16) and (20), the CBD b(v) is expressed as follows:

$$b_0^1=(1-t_1)b_2^0+t_1 b_1^1=k_0^0 a_0^1 \tag{29}$$

By replacing the above equation (29) into the equations (23) and (24), the following equation (30) is obtained.

$$(1-t_1)\left(\frac{2}{3}k_0^1 a_1^0 + \frac{1}{3}k_0^0 a_0^1\right) + t_1\left(\frac{2}{3}k_0^1 a_1^0 + \frac{1}{3}k_0^0 a_1^1\right) = k_0^1 a_0^1 \tag{30}$$

Since the CBD a(v) is $C^1$ continuous, by using the equation (28), the equation (30) is simplified to the following equation (31):

$$((1-t_1)k_0^0-k_0^1+t_1 k_0^2)a_0^1=0 \tag{31}$$

Similarly, the equations related to $b_0^2$ are also obtained in the above described processes. By generalizing the above equation (31), the following equations 32 are derived when m knots exist on a boundary curve including ends of the boundary curve.

$$(1-t_1)k_0^0 \quad -k_0^1 \quad +t_1 k_0^2 \qquad\qquad\qquad\qquad = 0 \qquad (32)$$

$$(1-t_2)k_0^1 \quad -k_0^2 \quad +t_2 k_0^2 \qquad\qquad\qquad = 0$$

$$\vdots$$

$$(1-t_i)k_0^{i-1} \quad -k_0^i \quad +t_i k_0^{i+1} \qquad = 0$$

$$\vdots$$

$$(1-t_{m-2})k_0^{m-3} \quad -k_0^{m-2} \quad +t_{-2}k_0^{m-1} = 0$$

The above equations (32) are expressed by the following matrix (34). The equations (33) and (35) are also related to the matrix (34).

$$TK = 0 \qquad (33)$$

$$T = \begin{pmatrix} (1-t_1) & -1 & t_1 & & & \\ & (1-t_2) & -1 & t_2 & & \\ & & \vdots & & & \\ & & (1-t_i) & -1 & t_i & \\ & & & \vdots & & \\ & & & (1-t_{m-2}) & -1 & t_{m-2} \end{pmatrix} \qquad (34)$$

$$K = [k_0^0, k_0^1, \ldots, k_0^i, \ldots, k_0^{m-1}]^T \qquad (35)$$

A scalar value $k_0^i$ at a knot in the conditional equation is determined. Thus, when a CBD a(v) is appropriately determined, based upon the above equations (22) through (27), the in-between control points vector $b_j^i$ on a $C^1$ continuous curve surface are obtained.

Figure 7:
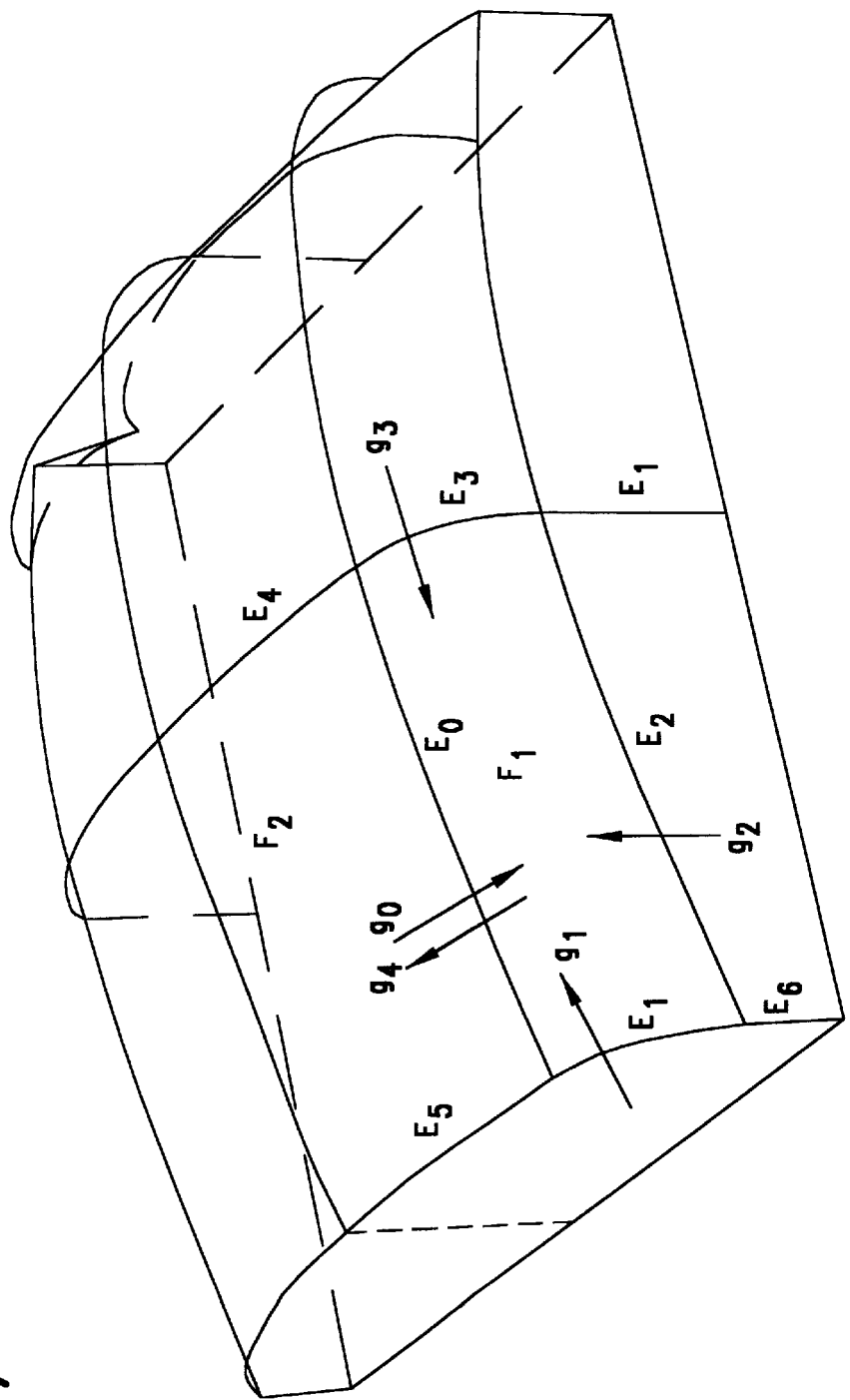
FIG. 7 diagrammatically illustrates the interpolation of a NBG patch.
Figure 8:
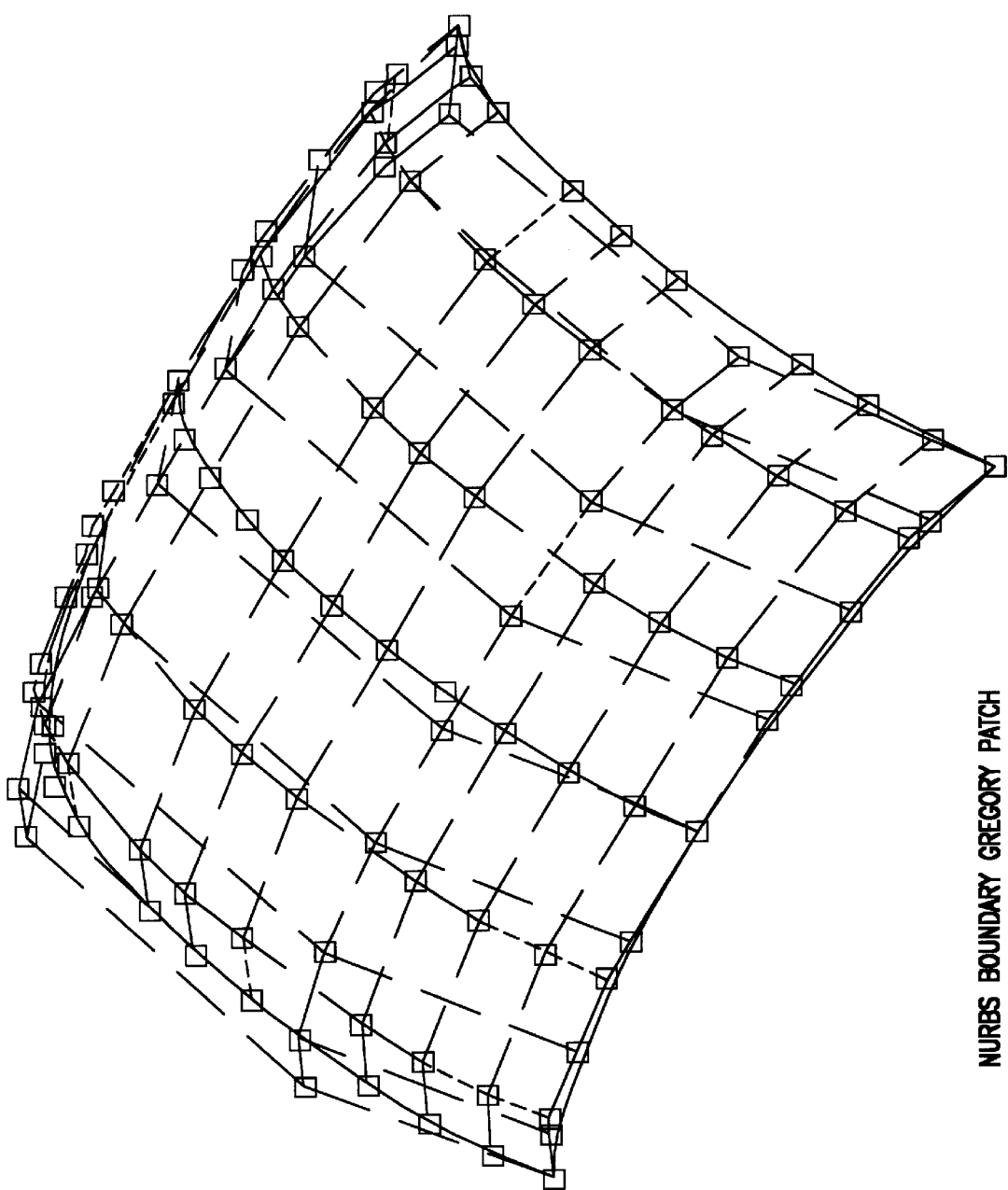
FIG. 8 diagrammatically illustrates the formed NBG patch.

Referring to FIG. 7, a simple curve mesh is illustrated for the interpolation of a curve mesh by a NBG (NBG) patch. A surface $F_1$ refers to an area bounded by four NURBS curves $E_i$(i=0, . . . ,3). The surface $F_1$ is interpolated by a NBG patch in the following manner. A CBD $g_0(t)$ is expressed by a NURBS curve and is defined by control vectors added to edges $E_0$, $E_1$ and $E_3$. If the end of the tangent vectors of the edges $E_1$, $E_3$, $E_4$ and $E_5$ are connected to an edge $E_0$ and these vectors satisfy the conditions of the above equation (13), all of the edges are referenced to define the cross boundary derivative (CBD) $g_0(t)$. This means that the CBD's around the boundary edge $E_0$ are related to $g_0(t) = -g_4(t)$ if two faces $F_1$ and $F_2$ are $G^1$ continuous. Other CBD's $g_i(t)$(i=1, . . . , 3) are similarly defined. After all CBD's of the face $F_1$ have been defined, the interior control points are calculated according to the above described joining equations. Accordingly, the U and V surfaces are determined, and the C surface is consequently determined according to the equations (9) through (12). FIG. 8 illustrates a NBG patch that is formed according to the above described process.

Figure 9:
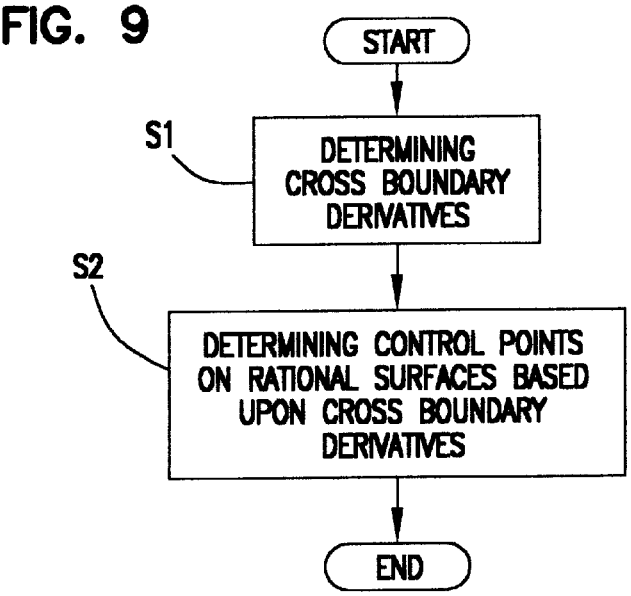
FIG. 9 and 10 are respectively a flow chart illustrating steps involved in the $G^1$ continuous interpolation process.
Figure 10:
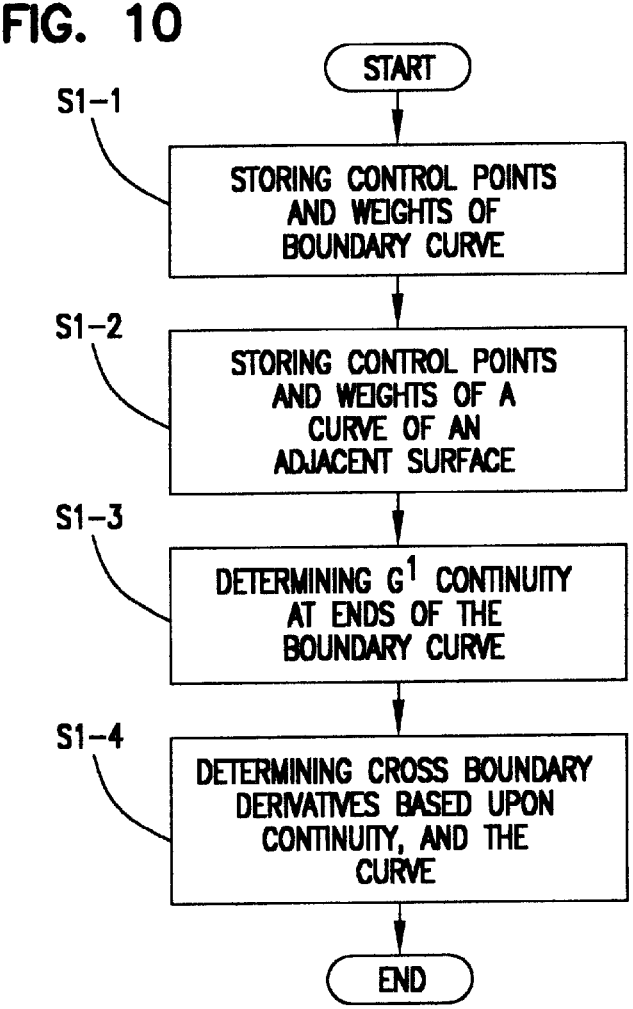

Now referring to FIGS. 9 and 10, steps involved in a process of joining surfaces are illustrated according to the current invention. FIG. 9 shows general steps while FIG. 10 describes some more detail steps. Referring in particular to FIG. 9, in a step S1, CBDs are determined for each boundary that forms a surface and stored, and in a step 2, control points for a rational curve surface are generated based upon the CBDs. Referring in particular to FIG. 10, in a step S1-1, control points and associated weights for each boundary are stored. In a step 1-2, among curves connected to an end of a boundary curve, control points and associated weights for a curve which forms an adjacent surface are stored. In a step 1-3, G1 continuity is examined at a terminal of the boundary curve, and the result is stored. Lastly, in a step 1-4, based upon the control points stored in the steps 1-1 and 1-2 and the continuity determined in the step 1-3, CBDs are determined according to the current invention.

One preferred process of assuring the above described $G^1$ and $C^1$ continuity according to the current invention, referring to FIG. 11, the step 1-4 of FIG. 10 is further described. In a step 2-1, knot vectors on a NURBS boundary curve are obtained. For example, the knot vectors are obtained in the following form:

$$[x_0, x_0, x_0, x_1, x_1, x_1, x_2, x_2, x_2, \ldots x_i, x_i, x_i, \ldots, x_n, x_n, x_n]$$

Since the above vectors are duplicated, the duplicated vectors are removed and the following data is generated in a step 2-2:

$$[x_1, x_2, \ldots x_i \ldots, x_n]$$

In a step 2-3, a difference between two adjacent elements in the data generated in the step 2-2 is determined. That is, the difference $t_i$ is determined to be as follows:

$$t_i = x_i - x_{i-1}$$

Lastly, in a step 2-4, based upon the above determined differences, a equation T for the $C^1$ continuity is generated.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of generating free-from surfaces with non uniform rational B-splines (NURBS) boundary Gregory patches, comprising the steps of:

a) selecting a common NURBS boundary curve between two free-form surfaces;

b) joining the two free-form surfaces in $G^1$ continuity, the $G^1$ continuity being expressed by a following equation, b(u)=k(u)a(u) where a(u) is a basis patch and b(u) is a cross boundary derivative of one of the two free-form surfaces and k(u) is a scalor function, said cross boundary derivative is expressed in a following equation $$b(u) = \sum_{i=0}^{m} N_{l,k}(u) b_j^i$$

where $N_{1,k}$ is a B-spline basis function and $b_j^i$ is a control point vector; and c) maintaining $C^1$ continuity in each of the joined free-form surfaces, the $C^1$ continuity at a joint P on the boundary curve being satisfied based upon a following equation $b^{i+1}{}_0 = (1-t_{i+1}) \, b^i{}_2 + t_{i+1} \, b^{i+1}{}_1$ where $t_i$ and $t_{i+1}$ indicate a difference in knots on the NURBS boundary curve.

2. The method of generating free-form surfaces with NURBS boundary Gregory patches according to claim 1 wherein TK=0 where T is a matrix of coefficients for the scalor function k(u)

$$T = \begin{pmatrix} (1-t_1) & -1 & t_1 & & & \\ & (1-t_2) & -1 & t_2 & & \\ & & \cdots & & & \\ & & & (1-t_i) & -1 & t_i \\ & & & & \cdots & \\ & & & & & (1-t_{m-2}) & -1 & t_{m-2} \end{pmatrix}$$

$K=[k_0{}^0, k_0{}^1, \ldots, k_0{}^i, \ldots, k_0{}^{m-1}]^T.$

3. A method of generating free-form surfaces with non uniform rational B-Spline (NURBS) boundary Gregory patches, comprising the steps of:

a) storing information on control points and corresponding weights for a common NURBS boundary curve;

b) storing information on control points and corresponding weights of a curve connected to a terminal of the common NURBS boundary curve;

c) determining conditions for a $G^1$ continuity at the terminal based upon the information stored in said steps a) and b);

d) forming along the common NURBS boundary free-form surfaces that are $G^1$ continuous with each other; and e) making each of the surfaces formed in said step d) $C^1$ continuous based upon information stored in said steps a) and b) as well as the conditions determined in said step c).

4. A recording medium containing a computer program for generating free-form surfaces with non uniform rational B-Spline (NURBS) boundary Gregory patches, the computer program comprising the steps of:

a) selecting a common NURBS boundary curve between two free-form surfaces;

b) joining the two free-form surfaces in $G^1$ continuity, the $G^1$ continuity being expressed by a following equation, b(u)=k(u)a(u) where a(u) is a basis patch and b(u) is a cross boundary derivative of one of the two free-form surfaces and k(u) is a scalar function, said cross boundary derivative being expressed in a following equation $b(u) = \Sigma^m{}_{1=0} \, N_{1,k}(u) b_j^i$ where $N_{1,k}$ is a B-spline basis function and $b_j^i$ is a control point vector; and c) maintaining $C^1$ continuity in each of the joined free-form surfaces, the $C^1$ continuity at a joint P on the boundary curve being satisfied based upon a following equation $b^{i+1}{}_0 = (1-t_{i+1}) \, b^i{}_2 + t_{i+1} \, b^{i+1}{}_1$ where $t_i$ and $t_{i+1}$ indicate a difference in knots on the NURBS boundary curve.

5. The recording medium containing a computer program for generating free-form surfaces with NURBS boundary Gregory patches according to claim 4 wherein TK=0 where T is a matrix of coefficients for scalor function k(u)

TK=0

$$T = \begin{pmatrix} (1-t_1) & -1 & t_1 & & & \\ & (1-t_2) & -1 & t_2 & & \\ & & \cdots & & & \\ & & & (1-t_i) & -1 & t_i \\ & & & & \cdots & \\ & & & & & (1-t_{m-2}) & -1 & t_{m-2} \end{pmatrix}$$

$K=[k_0{}^0, k_0{}^1, \ldots, k_0{}^i, \ldots, k_0{}^{m-1}]^T.$

6. A recording medium containing a computer program for generating free-form surfaces with non uniform rational B-Spline (NURBS) boundary Gregory patches, comprising the steps of:

a) storing information on control points and corresponding weights for a common NURBS boundary curve;

b) storing information on control points and corresponding weights of a curve connected to a terminal of the common NURBS boundary curve;

c) determining conditions for a $G^1$ continuity at the terminal based upon the information stored in said steps a) and b);

d) forming along the common NURBS boundary free-form surfaces that are $G^1$ continuous with each other; and e) making each of the surfaces formed in said step d) $C^1$ continuous based upon information stored in said steps a) and b) as well as the conditions determined in said step c).

\* \* \* \* \*